Feb. 4, 1936.    S. N. HURT    2,029,926
WEIGHING SCALE
Filed Feb. 2, 1935    2 Sheets-Sheet 2
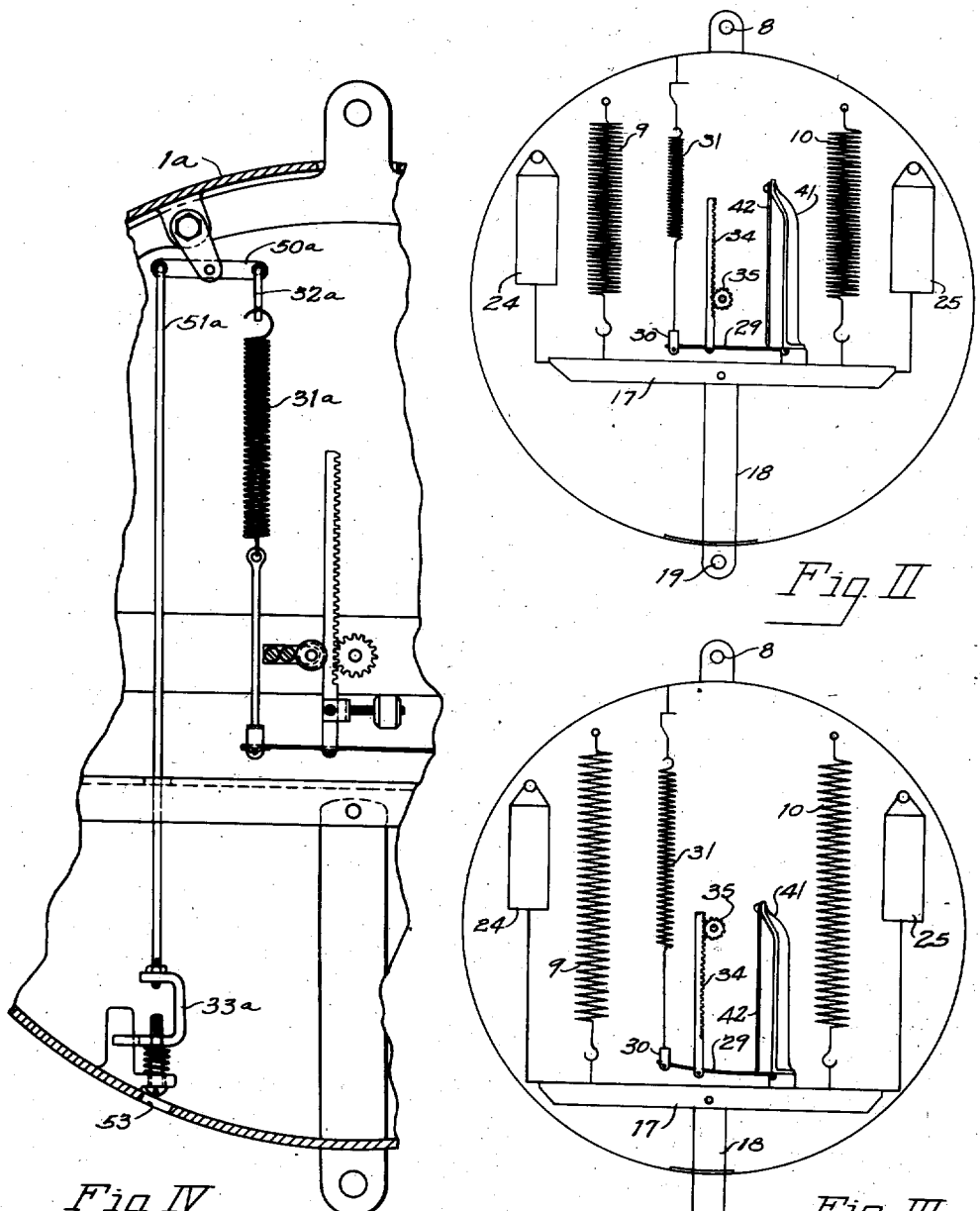
Samuel N. Hurt
INVENTOR
BY C. O. Marshall
ATTORNEY Patented Feb. 4, 1936

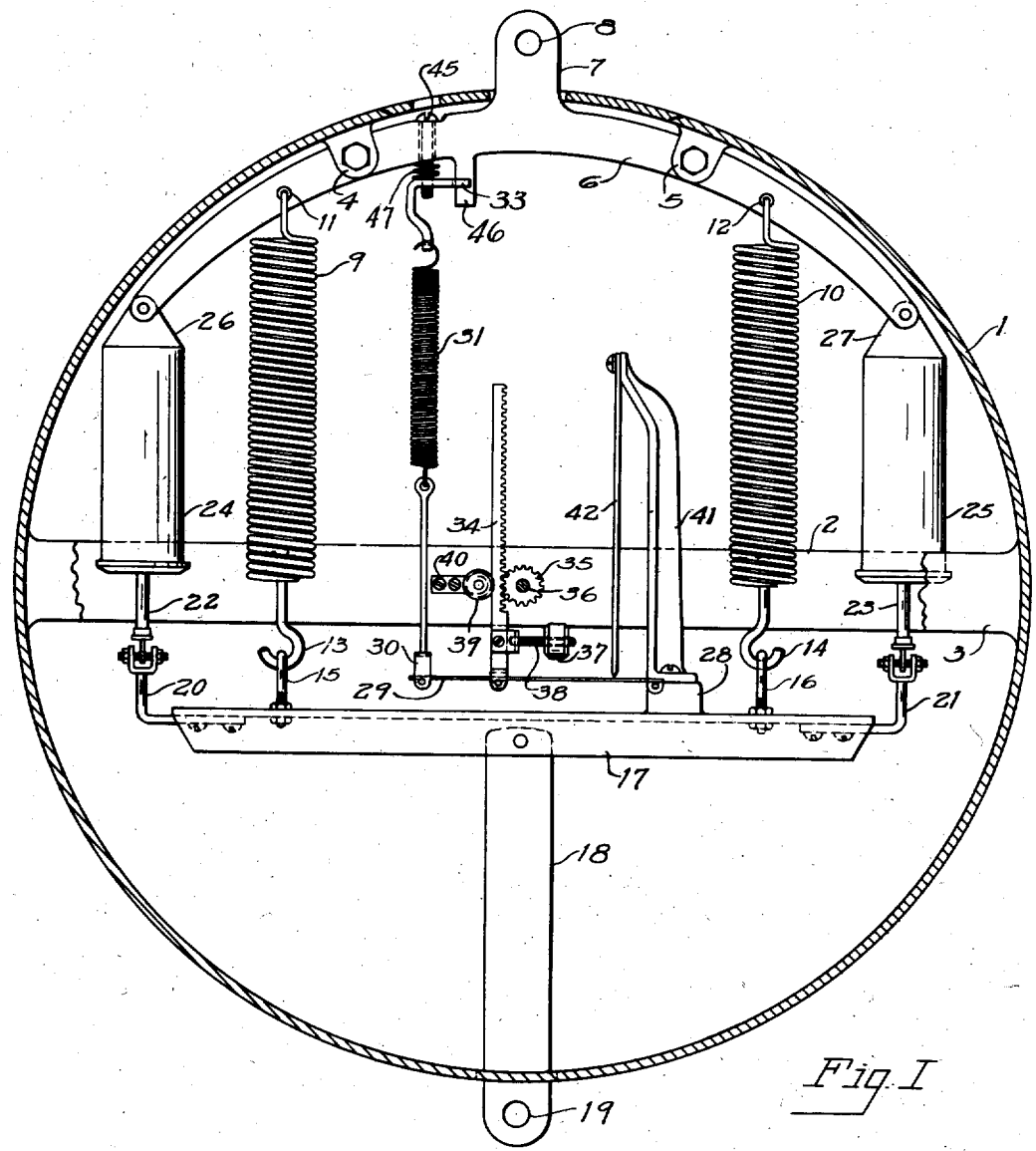
Fig. I

2,029,926

UNITED STATES PATENT OFFICE 2,029,926

WEIGHING SCALE

Samuel N. Hurt, Toledo, Ohio, assignor to Toledo Scale Manufacturing Company, Toledo, Ohio, a corporation of New Jersey Application February 2, 1935, Serial No. 4,618

7 Claims. (Cl. 265—69)

This invention relates to weighing scales, and particularly to weighing scales in which load counterbalancing is accomplished by springs.

In weighing scales of this type the springs expand and become less stiff with rises in temperature and contract and become more stiff as the temperature falls.

It is an object of my invention to provide a simple and effective means for compensating for such expansion and contraction and change of stiffness in the load-counterbalancing springs by causing the scale indicator to remain at zero position notwithstanding such expansion and contraction and to move equal distances for equal variations in load notwithstanding changes in stiffness of the load-counterbalancing springs.

Other objects and advantages will be apparent from the following description, in which reference is had to the accompanying drawings illustrating a preferred embodiment of my invention and wherein similar reference numerals designate similar parts throughout the several views.

In the drawings:

Figure I is a rear elevational view of a load-counterbalancing mechanism embodying my invention, and the framework supporting same, the rear cover of the framework being removed and parts being broken away to more clearly disclose the mechanism;

Figure II is a view showing diagrammatically the mechanism in "no load" position;

Figure III is a view showing diagrammatically the mechanism in the position assumed by it under load; and Figure IV is a detail fragmentary view showing a modification of a manually operable zero adjusting device which may be employed in the mechanism of my invention.

The invention is illustrated as embodied in a dial scale of the hanging type, though it is equally applicable to other forms of spring scales having revoluble indicators.

Referring to the drawings in detail, the framework, which supports the load-counterbalancing mechanism in the form of the device illustrated, comprises a hoop-like annulus 1 having a pair of bars 2 and 3 extending diametrically across it at its front and rear edges. Secured to lugs 4 and 5 which project inwardly from the upper part of the annulus 1 is a curved bar 6, to the center of which is secured an ear 7 which extends upwardly through an opening in the annulus 1 and is provided with an eye 8 to receive a hook (not shown) from which the scale may be suspended.

A pair of load-counterbalancing helical coil springs 9 and 10 are suspended, by means of hooks formed at their upper ends, from openings 11 and 12 formed in the curved bar 6, the lower ends of the springs being connected, by means of hooks 13 and 14 adjustably secured at the lower ends of the springs, to eyes 15 and 16, which, in turn, are secured to a transversely extending channel-shaped equalizer 17, a load-supporting bar 18 being pivotally connected at its upper end to the equalizer 17 midway between the eyes 15 and 16 and having its lower end, which projects through an opening in the lower side of the annulus 1, provided with an eye 19 to which the bail of a load-receiving pan (not shown) may be connected.

The equalizer 17 is provided at its ends with upturned ears 20 and 21, to which are pivotally connected the lower ends of plunger rods 22 and 23, the upper ends of the rods 22 and 23 being connected to plungers (not shown) which reciprocate vertically in inverted dashpots 24 and 25, the upper ends of which are provided with lugs 26 and 27, which lugs are secured to the ends of the curved rod 6 so that the dashpots 24 and 25 are supported thereby.

Mounted on the web of the channel-shaped equalizer 17 is a block 28 and secured to the block 28 is one end of a laterally extending leaf spring 29, to the opposite end of which is pivotally connected a stirrup 30, the stirrup 30 being hung from the lower end of a light helical spring 31, the upper end of which is connected to a bracket 33 mounted for vertical adjustment on the upper part of the annulus 1. Pivotally supported on the laterally extending leaf spring 29, intermediate the block 28 and the stirrup 30, is the lower end of an upwardly extending rack 34 which meshes with a pinion 35 mounted on the shaft 36 which is journaled in bearings in the diagonally extending bars 2 and 3 and to which is fixed the pointer or indicating hand (not shown) of the scale. A small weight 37, supported on a short arm 38 which is fixed to the rack 34, serves to hold the rack with slight pressure in mesh with the pinion, and a guard roller 39, mounted by means of a bracket 40 on the diagonally extending bar 2, serves to prevent the rack from jumping out of mesh with the pinion when the scale is subjected to shock.

Secured to the block 28 and extending upwardly therefrom is a standard 41, adjacent the top of which is fixed the upper end of a bimetallic thermosensitive element 42. The lower end of the element 42, which is preferably provided with a chisel edge, engages the upper surface of the leaf spring 29, and the composition and structure of the element 42 is such that when the temperature rises the element 42 bends to move its lower end toward the block 28 along the upper surface of the leaf spring 29 and when the temperature falls the element 42 bends in the opposite direction to move its lower end along the upper surface of the leaf spring 29 away from the block 28. The effective length of the leaf spring 29, and hence the extent to which it may be bent by a given pull of the light spring 31, is dependent upon the position of the lower end of the thermosensitive element 42.

For the purpose of initially adjusting the scale or setting it on zero, an adjusting screw 45 is provided to move the bracket 33 up and down, the bracket 33 being guided in such movements by a lug 46 depending from the bar 6. A coil spring 47 surrounds the adjusting screw 45 and serves to take up any looseness which may exist between the threads of the screw 45 and the threads in the bracket 33.

*Operation*

When a load is placed upon the load-receiver hung at the lower end of the drawbar 18, the equalizer bar 17 is pulled downwardly, thereby stretching the relatively heavy load-counterbalancing springs 9 and 10 to an extent approximately proportional to the weight of the load, vibration of the mechanism being damped by the action of the plungers upon the air within the dashpots 24 and 25. As the equalizer 17 moves downwardly it carries the block 28, leaf spring 29 and rack 34 downwardly also, but the relatively light spring 31, as it stretches under the downward movement, exerts a small upward pull on the end of the leaf spring 29, thus bending the leaf spring 29 slightly, so that the downward movement of the rack 34 is slightly less than the downward movement of the equalizer 17. The extent to which the leaf spring 29 is bent during a given downward movement depends not only upon the stiffness of the leaf spring 29 and the pull exerted by the light coil spring 31, but also upon the position of the lower end of the thermosensitive element 42. Since the lower end of the element 42 moves toward the block 28 under the influence of rising temperature, thus lengthening the spring 29, and moves away from the block 28 under the influence of a fall in temperature, thus shortening the spring 29, the spring 29 is permitted to bend upwardly to a greater extent when the temperature is high and the springs 9 and 10 stretch further under a given load, and when the temperature is lowered and the springs 9 and 10 stretch less under a given load the leaf spring 29 is shortened and bends less in response to the pull of the light spring 31. The length and stiffness of the leaf spring 29, the stiffness of the light spring 31, and the structure, composition and length of the thermosensitive element 42 are so proportioned that the rack 34 moves downwardly equal distances for equal changes in load upon the equalizer 17 at all temperatures at which the scale is intended to operate. Ordinarily the parts are constructed and proportioned to provide for equal movements of the indicator for equal changes in load at all temperatures ranging from −10 degrees Fahrenheit to +120 degrees Fahrenheit.

The parts are also so constructed and proportioned that when the equalizer 17 is subjected only to the load imposed by the weight of the drawbar 18 and that of the bail and pan of the load-receiver, the position of the rack 34 remains unchanged during changes in temperature from −10 degrees Fahrenheit to +120 degrees Fahrenheit. When the temperature change is such as to lengthen the load-counterbalancing springs 9 and 10, the lower end of the thermosensitive element 42 moves toward the block 28, thus lengthening and weakening the leaf spring 29, so that it is bent upwardly by the contractile force of the light spring 31. When the load-counterbalancing springs 9 and 10 shorten with a drop in temperature, the leaf spring 29 is shortened and stiffened and the light spring 31 is stretched slightly, so that the position of the rack 34 remains unchanged.

In a weighing scale embodying this invention which was constructed by the applicant, the load-counterbalancing springs 9 and 10 were made to stretch slightly more than three inches under 30 pounds of load, and the extent of stretch was found to vary approximately $\frac{1}{16}$ inch when the springs were subjected to variations in temperature ranging from −10 degrees Fahrenheit to +120 degrees Fahrenheit. The light coil spring 31 was made slightly less than one-thirtieth as stiff as the load-counterbalancing springs; the thermosensitive element 42 was so proportioned that the position of its lower end changed one-quarter of an inch when the element was subjected to temperature variations ranging from −10 degrees Fahrenheit to +120 degrees Fahrenheit and the leaf spring 29 was so proportioned that when a load of 30 pounds was placed upon the scale the pull of the light spring would flex the leaf spring at the point of attachment of the rack $\frac{1}{16}$ inch more at +120 degrees Fahrenheit than at −10 degrees Fahrenheit, thus compensating for the increased stretch in the load-counterbalancing springs and causing the rack to move the same distance for a given load at +120 degrees Fahrenheit as at −10 degrees Fahrenheit.

To set the indicator on zero for the purpose of compensating for changes in weight of the load-receiver, etc., the adjusting screw 45 is turned to move the bracket 33 up or down, thus lifting or lowering the light spring 31, and consequently lifting or lowering the rack 34. The adjusting device shown in Figure I is accessible from the top of the scale.

In Figure IV is illustrated a modification which makes the adjusting device accessible from the lower side of the scale. In the modification shown in Figure IV the spring 31a is supported by a loop 32a hung from one end of a lever 50a fulcrumed on a lug secured to the annulus 1a. The other end of the lever 50a is connected, by means of a rod 51a, to a bracket 33a mounted for vertical adjustment on the lower side of the annulus 1a. Adjusting the bracket 33a upwardly lowers the spring 31a and the rack, and adjusting the bracket 33a downwardly raises the spring 31a and the rack. The annulus 1a is provided with an opening, as at 53, through which the adjusting screw 45 may be reached by a screwdriver.

Thermosensitive elements similar to the thermosensitive element 42 have been arranged to vary the length of leaf springs which support load-counterbalancing springs. Very great forces are exerted upon such prior art thermosensitive elements by the leaf spring, to which the entire load is applied, and such forces tend to prevent proper action of the thermosensitive devices and to force them out of position. In contrast to such prior art devices, in the device of my invention the force exerted upon the thermosensitive device is very slight and has no tendency to prevent the thermosensitive device from operating effectively or to push it out of position.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, spring load-counterbalancing means, indicator-operating means, resilient means connecting said load-counterbalancing means and said indicator-operating means, means for flexing said resilient connecting means upon application of a load to said load-counterbalancing means, and means for controlling the extent of flexure of said resilient means to compensate for effects of changes in temperature upon said load-counterbalancing means.

2. In a device of the class described, in combination, spring load-counterbalancing means, load-supporting means supported by said spring load-counterbalancing means, a flexible member carried by said load-supporting means, indicator-operating means carried by said flexible member, relatively weak spring means, means connecting said relatively weak spring means and said flexible member whereby said flexible member is flexed upon movement of said load-supporting means, indicator-operating means moved by movement of said flexible member, and thermosensitive means for varying the extent of flexure of said flexible member.

3. In a device of the class described, in combination, spring load-counterbalancing means, load-supporting means supported by said spring load-counterbalancing means, a leaf spring carried by said load-supporting means, indicator-operating means carried by said leaf spring, a relatively light spring, means connecting said relatively light spring and said leaf spring whereby said leaf spring is flexed by movement of said load-supporting means to reduce movement of said indicator-operating means, and thermosensitive means for varying the flexibility of said leaf spring.

4. In a device of the class described, in combination, spring load-counterbalancing means, load-supporting means supported by said spring load-counterbalancing means, a leaf spring carried by said load-supporting means, indicator-operating means carried by said leaf spring, a relatively light spring, means connecting said relatively light spring and said leaf spring whereby said leaf spring is flexed by movement of said load-supporting means to reduce movement of said indicator-operating means, and thermosensitive means for varying the flexibility of said leaf spring, said thermosensitive means acting to increase the flexibility of said leaf spring with rising temperature and decrease the flexibility of said leaf spring with falling temperature.

5. In a device of the class described, in combination, spring load-counterbalancing means, load-supporting means supported by said load-counterbalancing means, a leaf spring having one end fixed to said load-supporting means, indicator-operating means carried by said leaf spring, a relatively light spring, means connecting said relatively light spring to said leaf spring whereby said leaf spring is flexed upon movement of said load-support to detract from the consequent movement of said indicator-operating mechanism, and thermosensitive means for varying the effective length of said leaf spring.

6. In a device of the class described, in combination, spring load-counterbalancing means, load-supporting means supported by said load-counterbalancing means, a leaf spring having one end fixed to said load-supporting means, indicator-operating means carried by said leaf spring, a relatively light spring, means connecting said relatively light spring to said leaf spring whereby said leaf spring is flexed upon movement of said load support to detract from the consequent movement of said indicator-operating mechanism, and thermosensitive means for varying the effective length of said leaf spring, said thermosensitive means acting to effectively lengthen said leaf spring with rising temperature and to effectively shorten said leaf spring with falling temperature.

7. In a device of the class described, in combination, a pair of helical load-counterbalancing springs, an equalizer supported thereby, means for supporting a load from said equalizer, a horizontally extending leaf spring having one of its ends fixed to said equalizer, a relatively light helical spring, means connecting said relatively light helical spring to the other end of said leaf spring whereby said leaf spring is flexed upon movement of said equalizer, a rack carried by said leaf spring intermediate its ends, and a thermosensitive element fixed to said equalizer, said thermosensitive element engaging said leaf spring to vary its effective length in response to changes in temperature.

SAMUEL N. HURT.